United States Patent
Ohki (10) Patent No.: US 6,883,828 B2
(45) Date of Patent: Apr. 26, 2005

(54) VEHICLE BODY STRUCTURE WITH HEAD PROTECTING AIRBAG

(75) Inventor: Yutaka Ohki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 164 days.

(21) Appl. No.: 10/357,928

(22) Filed: Feb. 4, 2003

(65) Prior Publication Data

US 2003/0146607 A1 Aug. 7, 2003

(30) Foreign Application Priority Data

Feb. 6, 2002 (JP) ....................................... 2002-029988

(51) Int. Cl.[7] ............................................. B60R 21/22
(52) U.S. Cl. ................................ 280/730.2; 280/728.2
(58) Field of Search .......................... 280/730.2, 728.2, 280/728.3; 296/218, 220.01; 52/716.6, 716.5, 717.01

(56) References Cited

U.S. PATENT DOCUMENTS

| | | | |
|---|---|---|---|
| 4,914,882 A | | 4/1990 | Tamamushi et al. |
| 5,501,052 A | * | 3/1996 | Saji ........................... 52/716.5 |
| 6,082,761 A | * | 7/2000 | Kato et al. ................ 280/730.2 |
| 6,364,346 B1 | * | 4/2002 | Preisler et al. ........... 280/730.2 |
| 6,485,048 B1 | * | 11/2002 | Tajima et al. ............ 280/728.2 |
| 6,565,116 B1 | * | 5/2003 | Tajima et al. ............ 280/730.2 |
| 6,672,027 B1 | * | 1/2004 | Mizutani et al. ........... 52/716.5 |

FOREIGN PATENT DOCUMENTS

| | | |
|---|---|---|
| EP | 1 112 900 A2 | 7/2001 |
| JP | 63-6384 | 9/1988 |
| JP | 2001010440 | 1/2001 |

* cited by examiner

*Primary Examiner*—David R. Dunn
(74) *Attorney, Agent, or Firm*—Rankin, Hill, Porter & Clark LLP (57) ABSTRACT

A vehicle body structure with a head protecting airbag includes a rear pillar garnish having a frame portion disposed in such a manner as to extend along an upper portion of a rear side window glass frame member, and a rear projecting portion projecting upwardly from a rear end of said frame portion to a rear window glass, the rear projecting portion being attached to a vehicle body panel via a clip boss; a roof lining having a side portion and a rear portion disposed so as to overlap a back surface of the frame portion and a back surface of the rear projecting portion, respectively; the head protecting airbag disposed on a back surface of the roof lining; and a supporting bracket attached to a back surface of a vicinity of a rear portion of the roof lining, the supporting bracket being attached to the vehicle body panel.

5 Claims, 8 Drawing Sheets

VEHICLE BODY STRUCTURE WITH HEAD PROTECTING AIRBAG

BACKGROUND OF THE INVENTION

1. Field of the Invention

The present invention relates to a vehicle body structure with a head protecting airbag wherein an airbag is provided on a back surface side of an automotive roof lining, wherein the roof lining is adapted to be dislocated from a rear pillar garnish by virtue of an expansion pressure resulting when the airbag is expanded, and wherein the airbag is allowed to expand into a passenger compartment through a gap so resulting between the rear pillar garnish and the roof lining.

2. Description of the Related Art

Pillar garnishes are provided on front pillars, center pillars and rear pillars which support a roof of an automobile as linings. Certain devices have been provided to have a good appearance at an abutment portion where each garnish abuts with another lining material. Known as an example of the devices is JP-B-63-6384 entitled "Automotive Trim Components Joining Portion Structure."

Incidentally, a roof lining is provided to the roof supported by the respective pillars as a lining. There also needs to have a good appearance at portions where the roof lining is joined to the pillar garnishes, and it is a common practice in order to have a good appearance at the joining portions that the circumferential edge of the roof lining is caused to overlap the back surface side of the pillar garnishes so that the circumferential edge of the roof lining is concealed with the pillar garnishes.

There are some constructions in which an airbag for protecting the head of a passenger is provided on the back surface side of the roof lining. A vehicle body structure is shown in FIG. 8 in which an airbag is provided on the back surface side of a roof lining, and the details thereof will be described below.

Figure 8:
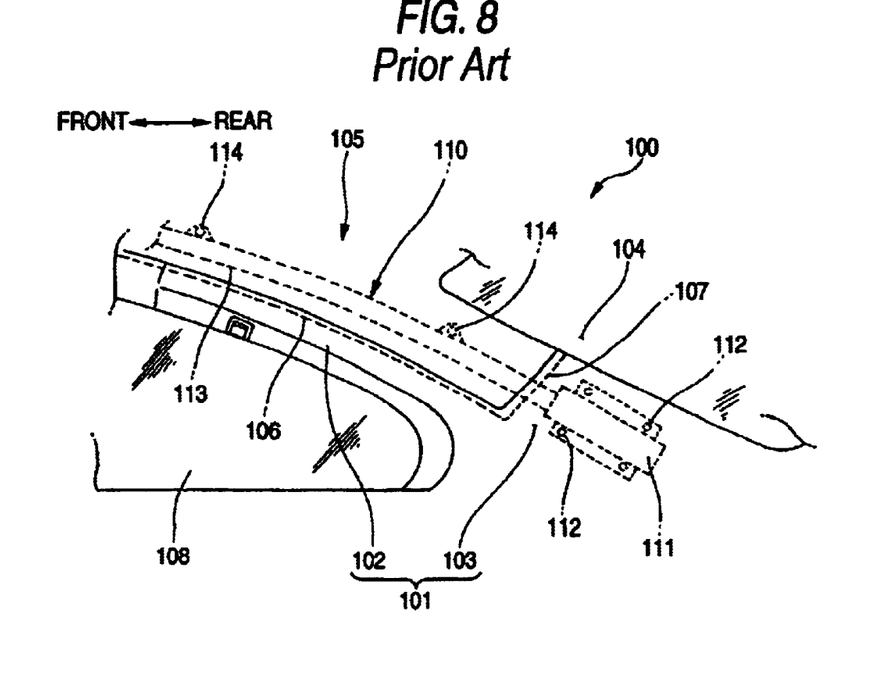
FIG. 8 is a side view of a conventional vehicle body structure with a head protecting airbag.

FIG. 8 is a side view of a conventional vehicle body structure with a head protecting airbag.

In a vehicle body structure with a head protecting airbag 100, a frame portion 102 of a rear pillar garnish 101 is provided in such a manner as to extend along an upper portion of a rear side window glass frame member, a rear projecting portion 103 of the rear pillar garnish 101 is caused to project upwardly from a rear end of the frame portion 102 until the rear projecting portion reaches a rear window glass 104, a side portion 106 and a rear portion 107 of a roof lining 105 are caused to overlap a back surface of the frame portion 102 and a back surface of the rear projecting portion 103 of the rear pillar garnish 101, respectively, and a head protecting airbag 110 is provided within a space existing between the roof lining 105 and a vehicle body panel. Note that reference numeral 108 denotes a rear side window glass.

Figure 9:
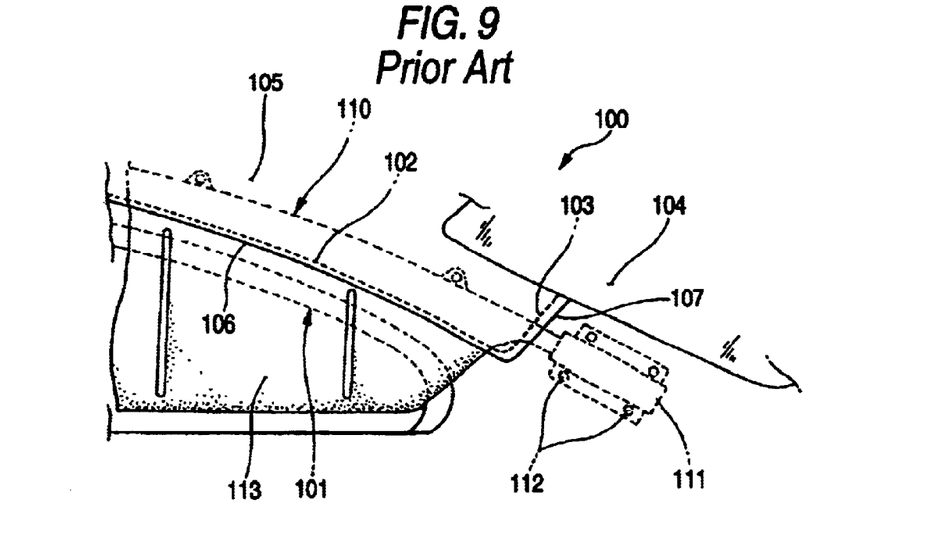
FIG. 9 is a side view showing a state in which a head protecting airbag of the conventional vehicle body structure with a head protecting airbag is expanded.

FIG. 9 is a side view showing a state in which an airbag of the conventional vehicle body structure with a head protecting airbag is expanded.

An inflator 111 for the head protecting airbag 110 is activated, and a gas is supplied to an airbag 113 from the inflator 111, whereby the airbag is expanded.

An expansion pressure is generated by the expansion of the airbag 113, and the side portion 106 of the roof lining 105 is dislocated from the frame portion 102 of the pillar garnish 101 toward the passenger compartment side with the expansion pressure, whereby a gap can be opened between the frame portion 102 of the pillar garnish 101 and the side portion 106 of the roof lining 105.

Thus, the airbag 113 can be expanded into the passenger compartment through the gap so opened so that the head of a rear seat passenger can be protected with the airbag 113 so expanded.

With the vehicle body structure with a head protecting airbag 100, however, as shown in FIG. 8, the rear portion 107 of the roof lining 105 is also caused to extend along the vehicle body panel only with the rear portion 107 being caused to overlap the back surface of the rear projecting portion 103 of the pillar garnish 101.

Due to this, in the event that the expansion pressure of the airbag 113 is applied to the rear portion 107 of the roof lining 105, it becomes difficult to securely support the rear portion 107 of the roof lining 105 with the rear projecting portion 103 of the pillar garnish 101, and as shown in FIG. 9, there may be caused a risk that the rear portion 107 of the roof lining 105 is dislocated from the rear projecting portion 103 of the pillar garnish 101 toward the passenger compartment side.

In the event that the rear portion 107 of the roof lining 105 is dislocated from the rear projecting portion 103 of the pillar garnish 101, there may be caused a risk that a gap is generated between the rear portion 107 and the rear projecting portion 103, whereby the airbag 113 is also expanded into the passenger compartment through the gap so generated.

Consequently, a vehicle body structure has been long desired to be put in a practical use in which in the event that the expansion pressure of the airbag 113 is applied, the airbag 113 can be expanded stably through the gap between the frame portion 102 of the pillar garnish 101 and the side portion 106 of the roof lining 105.

SUMMARY OF THE INVENTION

Then, an object of the invention is to provide a vehicle body structure with a head protecting airbag in which in the event that the expansion pressure of an airbag is applied to a rear portion of a roof lining, the airbag can be expanded stably through a gap formed between a frame portion of a pillar garnish and a side portion of the roof lining.

With a view to attaining the object, according to a first aspect of the invention, there is provided a vehicle body structure with a head protecting airbag includes a rear pillar garnish having a frame portion disposed in such a manner as to extend along an upper portion of a rear side window glass frame member, and a rear projecting portion projecting upwardly from a rear end of said frame portion to a rear window glass, the rear projecting portion being attached to a vehicle body panel via a clip boss; a roof lining having a side portion and a rear portion disposed so as to overlap a back surface of the frame portion and a back surface of the rear projecting portion, respectively; the head protecting airbag disposed on a back surface of the roof lining; and a supporting bracket attached to a back surface of a vicinity of a rear portion of the roof lining, the supporting bracket being attached to the vehicle body panel.

The supporting bracket is attached to the back surface of the vicinity of the rear portion of the roof lining, and the supporting bracket is attached to the vehicle body panel. Thus, the vicinity of the rear portion of the roof lining can be attached to the vehicle body panel via the supporting bracket.

According to the construction, in the event that the expansion pressure of the airbag is applied to the vicinity of the rear portion of the roof lining, the rear portion of the roof lining can be securely left overlapping the back surface of the rear projecting portion of the rear pillar garnish.

Due to this, the side portion of the roof lining can be dislocated from the frame portion of the rear pillar garnish with good efficiency with the expansion pressure of the airbag so as to ensure the stable expansion of the airbag.

According to a second aspect of the invention, there is provided a vehicle body structure with a head protecting airbag as set forth in the first aspect of the invention, wherein the supporting bracket is caused to extend rearward toward the rear projecting portion, and wherein a positioning opening in which the clip boss is allowed to fit is formed in an extending portion formed as a result of the rearward extension of the supporting bracket.

The extending portion of the supporting bracket is caused to extend rearward toward the rear projecting portion, and the positioning opening is formed in the extending portion in which the clip boss is allowed to fit. Thus, by forming the positioning opening in the extending portion and inserting the clip boss in the positioning hole so formed, the clip boss can be positioned at the proper position using the positioning hole.

DETAILED DESCRIPTION OF THE PREFERRED EMBODIMENTS

An embodiment of the invention will be described below based on the accompanying drawings. Note that the drawings are to be viewed in a direction in which reference numerals are oriented.

Figure 1:
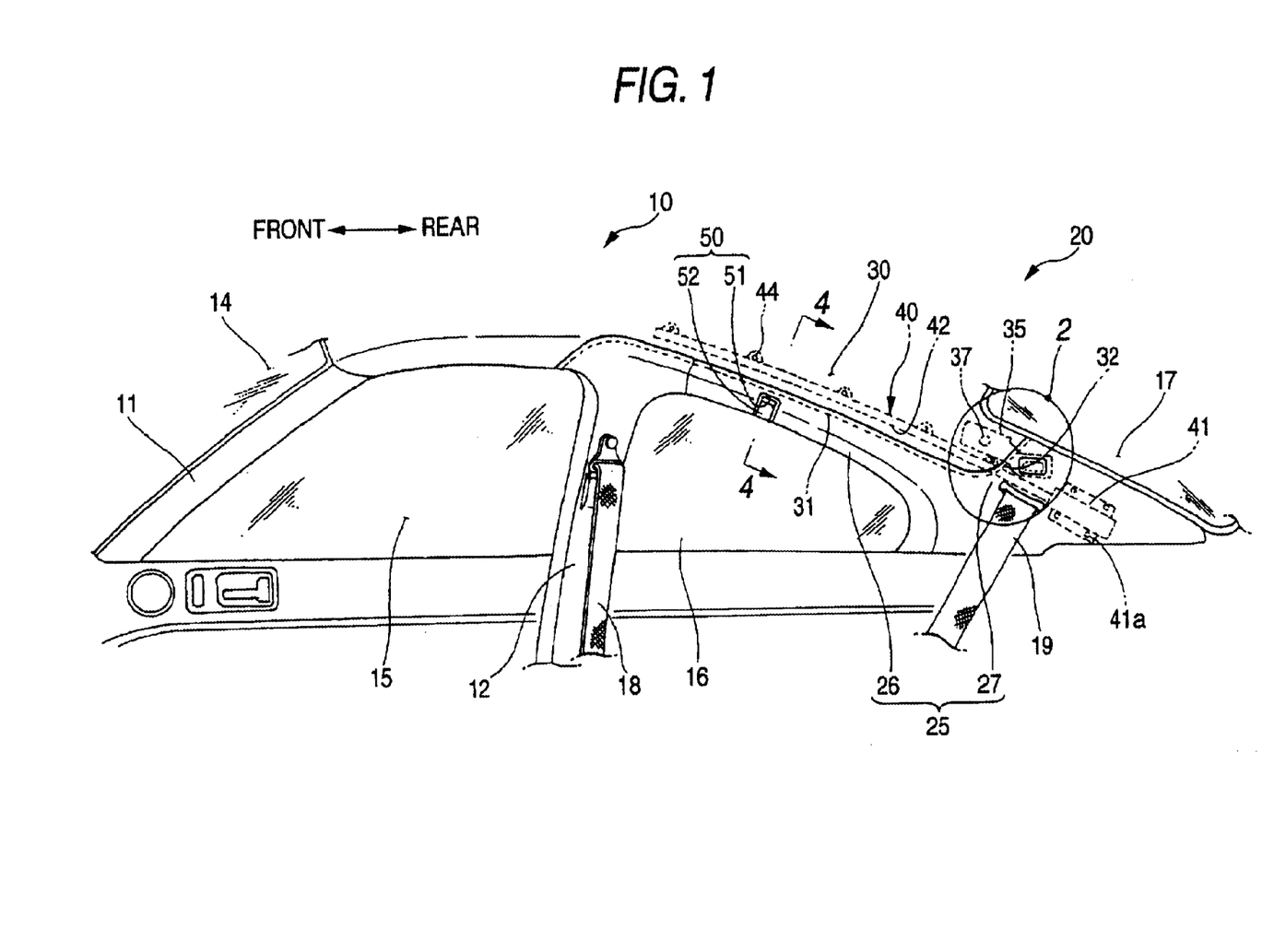
FIG. 1 is a side view of a vehicle provided with a vehicle body structure with a head protecting airbag according to the invention as viewed from a passenger compartment side of the vehicle.

FIG. 1 is a side view of a vehicle provided with a vehicle body structure with a head protecting airbag according to the invention, as viewed from a passenger compartment side of the vehicle.

A vehicle 10 comprises a front pillar garnish 11 attached to a passenger compartment side of a front pillar as an interior member, a center pillar garnish 12 attached to a passenger compartment side of a center pillar as an interior member, and a vehicle body structure 20 with a head protecting airbag on a-passenger compartment side of a rear pillar.

Note that reference numeral 14 denotes a windshield; 15: a front side window glass; 16: a rear side window glass; 17: a rear window glass, 18: a front seat belt; and 19: a rear seat belt.

Figure 3:
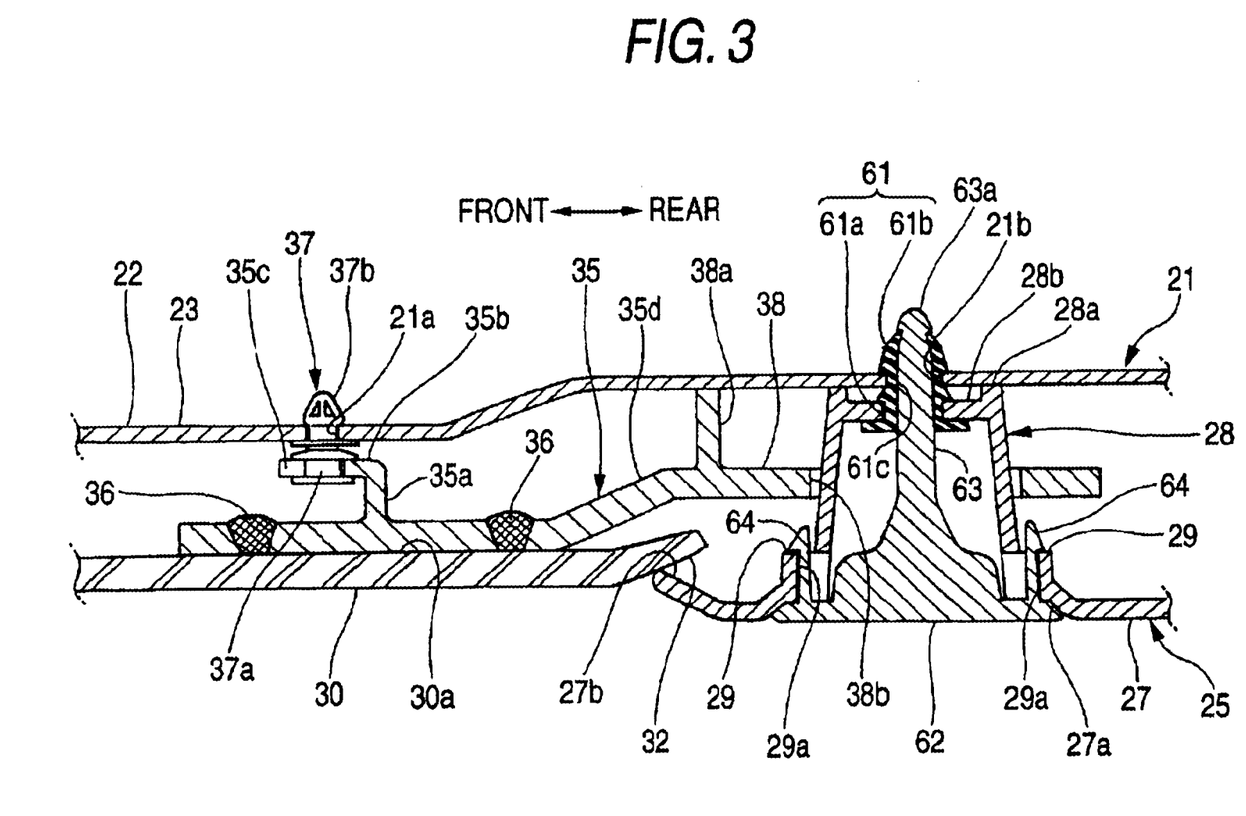
FIG. 3 is a sectional view taken along the line 3—3 in FIG. 2.

In this vehicle body structure 20 with a head protecting airbag, a frame portion 26 of a rear pillar garnish 25 is provided in such a manner as to extend along an upper portion 23 of a rear side window glass frame member 22 constituting a vehicle body panel 21 shown in FIG. 3, and a rear projecting portion 27 of the rear pillar garnish 25 is allowed to project upwardly from a rear end of the frame portion 26 until it reaches the rear window glass 17. Then, a side portion 31 and a rear portion 32 of a roof lining 30 is caused to overlap a back surface of the frame portion 26 and a back surface of the rear projecting portion 27, respectively, and a supporting bracket 35 is attached to a back surface of the roof lining 30. The roof lining 30 is then attached to the vehicle body panel 21 via the supporting bracket 35, and a head protecting airbag 40 is disposed on a back surface side of the roof lining 30. In addition, a casing 51 for a hanger 50 is integrally formed with the frame portion 26 of the rear pillar garnish 25, and a hook 52 for the hanger 50 is provided on the casing 51.

The head protecting airbag 40 is constructed as below. Namely, an inflator 41 is disposed on a back surface side of the rear projecting portion 27 of the rear pillar garnish 25, and the inflator 41 is attached to the vehicle body panel 21 with machine screws 41a . . . Then, an airbag 42 is attached to a distal end of the inflator 41 and is allowed to extend toward the front of the vehicle body panel 21 along the frame portion 26 of the rear pillar garnish 25. The air bag 42 is then attached to a supporting bracket 43 (shown in FIG. 4), and this supporting bracket 43 is attached to the vehicle body panel 21 with machine screws 44 . . .

Figure 2:
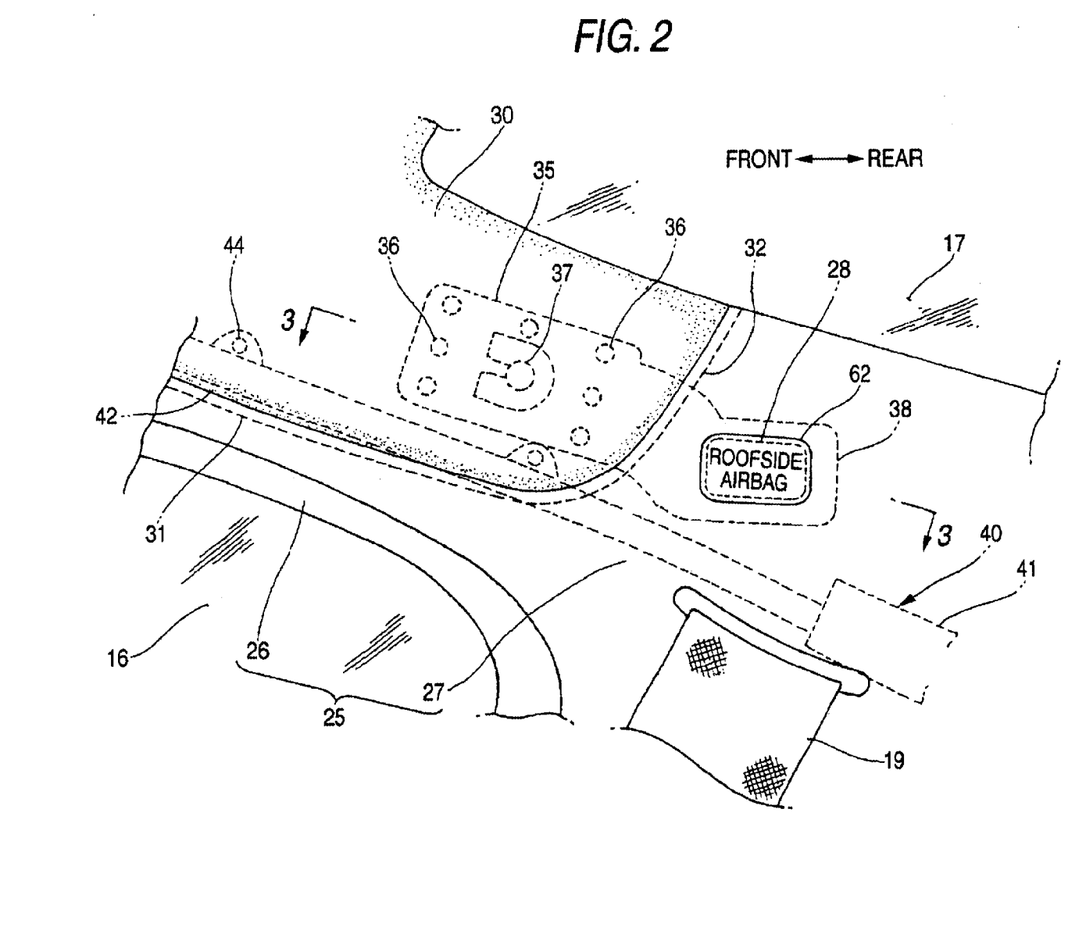
FIG. 2 is an enlarged view of a portion denoted by reference numeral 2 in FIG. 1.

FIG. 2 is an enlarged view of a portion of the vehicle body structure 20 with a head protecting airbag which is denoted by reference numeral 2 in FIG. 1. The vicinity of the rear portion 32 of the roof lining 30 is attached to the vehicle body panel by attaching the supporting bracket 35 to a back surface of the vicinity of the rear portion 32 of the roof lining 30 with a hot-melt adhesive 36 at a plurality of positions and then attaching the supporting bracket 35 to the vehicle body panel 21 (refer to FIG. 3) with a clip 37. The rear projecting portion 27 of the rear pillar garnish 25 is attached to the vehicle body panel 21 by providing a clip boss 28 on the back surface of the rear projecting portion 27 and then attaching the clip boss 28 to the vehicle body panel 21.

The side portion 31 of the roof lining 30 is caused to overlap the back surface side of the frame portion 26 of the rear pillar garnish 25 and the rear portion 32 of the roof lining 30 is also caused to overlap the back surface side of the rear projecting portion 27 of the rear pillar garnish 25 as the vicinity of the rear portion 32 of the roof lining 30 and the rear projecting portion 27 of the rear pillar garnish 25 are attached to the vehicle body panel 21, respectively, as described above.

FIG. 3 is a sectional view taken along the line 3—3 shown in FIG. 2. The supporting bracket 35 is attached to the back surface 30a of the vicinity of the rear portion 32 of the roof lining 30 with the hot-melt adhesive 36 at the plurality of positions. A leg piece 35a is formed at the vicinity of a front end of the supporting bracket 35 and a locking piece 35b is formed at an upper end of the leg piece 35a. A base portion 37a of the clip 37 is locked in a locking groove 35c of the locking piece 35b, and a diametrically enlarged portion 37b at a distal end of the clip 37 is caused to project from an attachment hole 21a in the vehicle body panel 21 to thereby lock the clip 37 in the vehicle body panel 21.

The vicinity of the rear portion 32 of the roof lining 30 can be attached to the vehicle body panel 21 via the supporting bracket 35 by locking the clip 37 to the vehicle body panel 21 so as to attach the supporting bracket 35 to the vehicle body panel 21 as has been described above.

The supporting bracket 35 is constructed as below. Namely, a bent portion 35d is formed at the center of the supporting bracket 35, and an extending portion 38 is provided such that it extends from the bent portion 35d to the rear of the vehicle body along the vehicle body panel 21. A stay 38a is extended from a front end of the extending portion 38 extended to the rear of the vehicle body toward the vehicle body panel 21 so that a distal end of the stay 38a is brought into abutment with the vehicle body panel 21, and a positioning opening 38b is formed substantially in the center of the extending portion 38 so that the clip boss 28 can be fitted thereinto.

The extending portion 38 can be supported by the stay 38a by allowing the distal end of the stay 38a to abut with the vehicle body panel 21.

The clip boss 28 is a hollow projecting body that is formed integrally with the rear projecting portion 27 of the rear pillar garnish 25 in such a manner as to project from the rear projecting portion 27 toward the vehicle body panel 21. In addition, stepped portions 29, 29 are formed at a proximal end of the clip boss 28, and locking holes 29a, 29a are formed in the stepped portions 29, 29, respectively. Furthermore, a projecting piece 28b is formed on an inner circumference of a distal end 28a of the clip boss 28 in such a manner as to extend radially inwardly.

An opening 27a is formed in the rear projecting portion 27 of the rear pillar garnish 25 by forming the clip boss 28 integrally with the rear projecting portion of the rear pillar garnish 25.

A grommet 61 is inserted into the distal end 28a of the clip boss 28 such that the projecting piece 28b fits in an annular groove 61a of the grommet 61, whereby a diametrically expanded portion 61b at a distal end of the grommet 61 is allowed to project from the distal end 28a of the clip boss 28.

In this state, the clip boss 28 is inserted into the opening 27a of the rear projecting portion 27 and the diametrically expanded portion 61b at the distal end of the grommet 61 is allowed to project from the attaching hole 21b in the vehicle body panel 21.

In this state, when the opening 27a of the rear projecting portion 27 is closed with a cap 62, a distal end 63a of a clip 63 which projects from the center of the cap 62 is allowed to project from a through hole 61c in the grommet 61.

Thus, the grommet 61 can be locked in the vehicle body panel 21, whereby the clip boss 28 can be attached to the vehicle body panel 21. Accordingly, the rear projecting portion 27 of the rear pillar garnish 25 can be attached to the vehicle body panel 21 via the clip boss 28.

In addition, when the opening 27a in the rear projecting portion 27 is closed with the cap 62, hooks 64, 64 projects from both ends of the cap 62 are allowed to project from the locking holes 29a, 29a formed in the stepped portions 29, 29 of the clip boss 28.

Thus, the hooks 64, 64 are locked at the stepped portions 29, 29, respectively, whereby the cap 62 can be locked in the opening 27a of the rear projecting portion 27, the removal of the distal end 63a of the clip 63 from the through hole 61c in the grommet 61 being thereby prevented.

Thus, the roof lining 30 is attached to the vehicle body panel 21 via the supporting bracket 35, and when the rear projecting portion 27 of the rear pillar garnish 25 is attached to the vehicle body panel 21 via the clip boss 28, the rear portion 32 of the roof lining 30 overlaps the back surface 27b of the rear projecting portion 27.

Here, a procedure will be described for attaching the roof lining 30 and the rear pillar garnish 25 to the vehicle body panel 21.

Firstly, the supporting bracket 35 is attached to the back surface 30a of the vicinity of the rear portion 32 of the roof lining 30 with the hot-melt adhesive 36, and the base portion 37a of the clip 37 is attached to the locking piece 35b of the supporting bracket 35, while the diametrically expanded portion 37b at the distal end of the clip 37 is inserted into the attaching hole 21a of the vehicle body panel 21 so that the diametrically expanded portion 37b is allowed to project from the attaching hole 21a.

Thus, the vicinity of the rear portion 32 of the roof lining 30 is attached to the vehicle body panel 21 via the supporting bracket 35.

Next, the grommet 61 is inserted into the distal end 28a of the clip boss 28 and the annular groove 61a of the grommet 61 is fitted on the projecting piece 28b. In this state, the clip boss 28 is inserted into the positioning opening 38b in the supporting bracket 35 (the extending portion 38).

Thus, the clip boss 28 can be positioned at the proper position by using the positioning opening 38b, and the diametrically expanded portion 61b at the distal end of the grommet 61 can simply be inserted into the attaching hole 21b in the vehicle body panel 21.

After the diametrically expanded portion 61b at the distal end of the grommet 61 inserted into the attaching hole 21b in the vehicle body panel 21 is allowed to project from the attaching hole 21b, the opening 27a of the rear projecting portion 27 is closed with the cap 62, whereby the distal end 63a of the clip 63 is allowed to project from the through hole 61c of the grommet 61 and the hooks 64, 64 are locked in the locking holes 29a, 29a in the stepped portions 29, 29.

Thus, the rear projecting portion 27 of the rear pillar garnish can be attached to the vehicle body panel 21 via the clip boss 28.

As has been described above, the clip boss 28 can be positioned at the proper position using the positioning opening 38b by inserting the clip boss 28 into the positioning opening 38b of the supporting bracket 35.

Consequently, since the diametrically expanded portion 61b at the distal end of the grommet 61 can simply be attached to the vehicle body panel 21, the rear pillar garnish 25 can simply be assembled to the vehicle body panel 21.

Returning to FIG. 1, the hanger 50 can be provided above the rear side window glass 16 by providing the hanger 50 in the frame portion 26 of the rear pillar garnish 26. With this hanger 50, something like the clothes of a passenger can be hooked on the hook 52 which is normally stored in the casing 51 of the hanger 50 by pulling it out of the casing 51.

Figure 4:
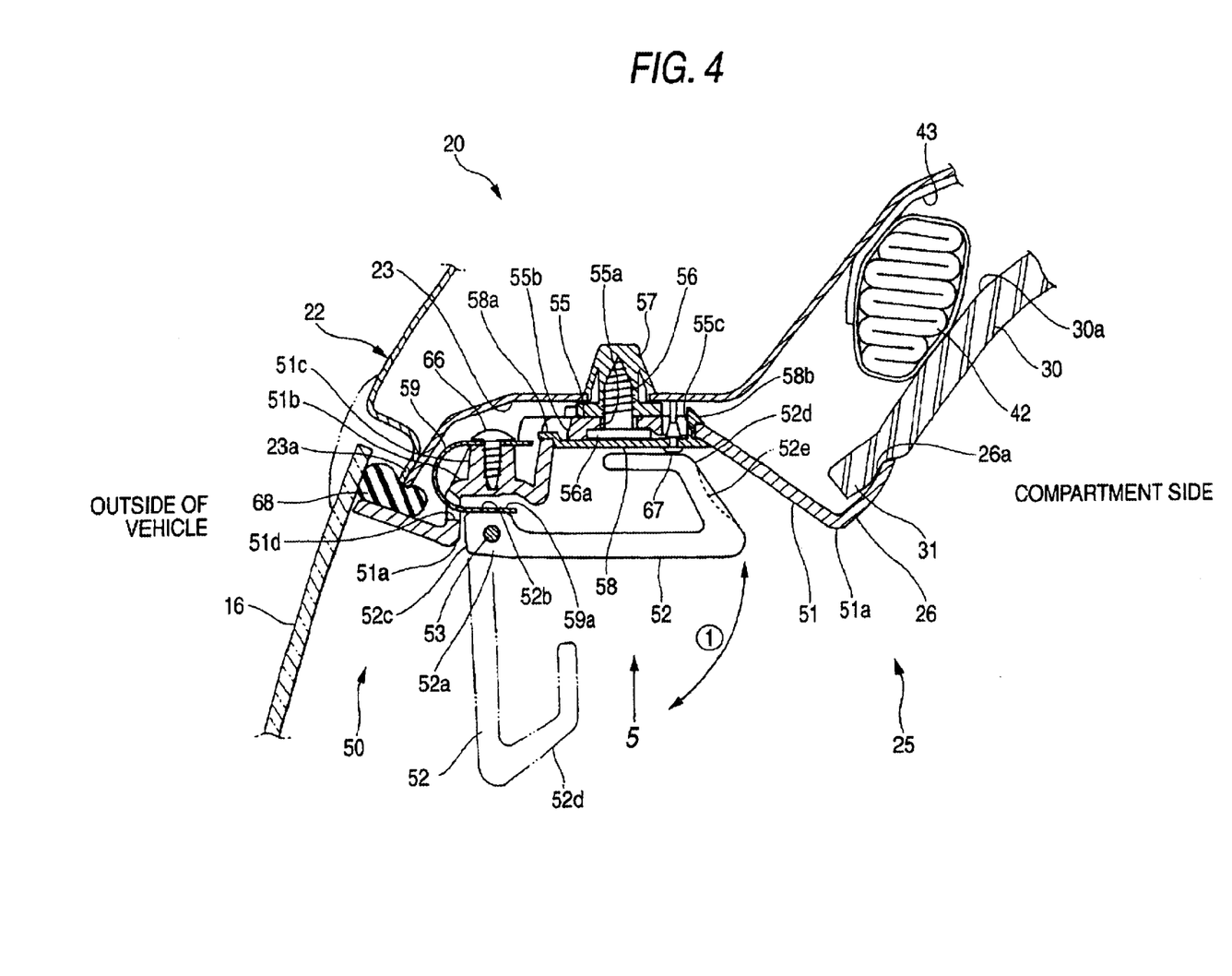
FIG. 4 is a sectional view taken along the line 4—4 in FIG. 1.

FIG. 4 is a sectional view taken along the line 4–4 in FIG. 1 and shows the relationship between the frame portion 26 of the rear pillar garnish 25 and the hanger 50.

In the vehicle body structure 20 with a head protecting airbag, the casing 51 for the hanger 50 is integrally formed with the frame portion 26 of the rear pillar garnish 25 in a recessed fashion in which the casing 51 is recessed upwardly, and the casing 51 is attached to the upper portion 23 of the side window glass frame member 22 with a machine screw 56, the hook 52 for the hanger 50 being provided on the casing 51 via a pin 53 in such a manner as to freely swing around the pin 53 in directions denoted by an arrow ①.

Thus, the hook 52 is allowed to swing around the pin 53 to move between a stored position (a position shown by a solid line) where the hook 52 is stored in the casing 51 and an in-use position (a position shown by an imaginary line) where the hook 52 is pulled out of the casing 51.

The pillar garnish 25 can rigidly be attached to the upper portion 23 of the side window glass frame member 22 by forming the casing 51 for the hanger 50 integrally with the frame portion 26 of the rear pillar garnish 25 and attaching the casing 51 to the upper portion 23 of the side window glass frame member 22 with the machine screw 56.

Furthermore, the number of components can be reduced by forming the casing 51 for the hanger 50 integrally with the frame portion 26 of the rear pillar garnish 25. In addition, the number of man hours required for assembling can be attempted to be reduced by making simple the construction of the vehicle body structure 20 with a head protecting airbag through the reduction in the number of components involved.

Figure 5:
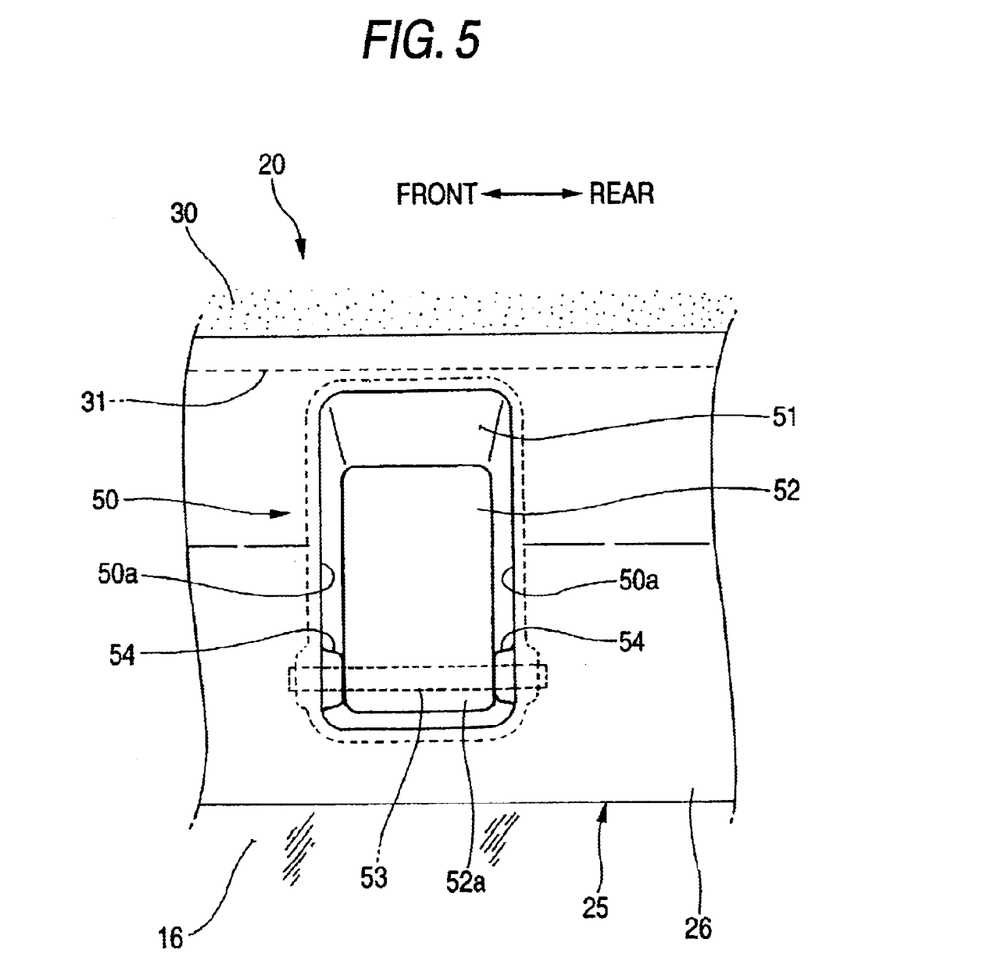
FIG. 5 is a view as viewed in a direction indicated by an arrow 5 in FIG. 4.

FIG. 5 is a view as viewed in a direction indicated by an arrow 5 in FIG. 4. The casing 51 for the hanger 50 is integrally formed with the frame portion 26 of the rear pillar garnish 25 in the recessed fashion, bosses 54, 54 are formed on side walls 50a, 50a of the casing 51 formed in the recessed fashion, respectively, and both ends of the pin 53 are attached to the bosses 54, 54 formed on the side walls 50a, 50a, whereby the pin 53 is attached to a base portion 52a of the hook 52.

Returning to FIG. 4, the construction of the hanger 50 will be described in detail.

An open edge 51a of the casing 51 is connected to the frame portion 26 of the rear pillar garnish 25 by forming the casing 51 for the hanger 50 integrally with the frame portion 26 of the rear pillar garnish 25 in the recessed fashion in which the casing 51 is recessed upwardly.

The casing 51 is provided with a ceiling portion 55, and the machine screw 56 is inserted into a through hole 55a in the ceiling 55, so that the machine screw 56 is screwed into a grommet 57 that has been assembled to the casing 51 in advance, whereby the grommet 57 can be attached to the casing 51 rigidly.

The rear pillar garnish 25 can be attached to the upper portion 23 of the rear side window glass frame member 22 together with the casing 51 by inserting the grommet 57 into an attaching hole in the upper portion 23 of the rear side window glass frame member 22.

When the ceiling portion 55 is covered with a cover plate 58, a head portion 56a of the machine screw 56 can also be covered with the cover plate 58.

Namely, in the casing 51, a left locking hole 55b is formed at a left end of the ceiling portion 55 and a right locking hole 55c is formed at a right end thereof, so that a locking piece 58a of the cover plate 58 is locked in the left locking hole 55b and a locking pawl 58b of the cover plate 58 is locked in the right locking hole 55c, whereby the cover plate 58 can be fixed to the ceiling portion 55.

Thus, as has been described above, the ceiling portion 55 can be covered with the cover plate 58 and the head portion 56a of the machine screw 56 can be covered with the cover plate 58.

The pin 53 is provided in the casing 51 at the vicinity of a side of the open edge 51a which faces the outside of the vehicle body (refer to FIG. 5), so that the base portion 52a of the hook 52 is supported by the pin 53, whereby the hook 52 is allowed to freely swing around the pin 53 in the directions indicated by the arrows ①.

In addition, a boss 51c is provided on a stepped portion 51b provided on the casing 51 at the vicinity of the side of the open edge 51a which faces the outside of the vehicle body, and an upper end of a plate spring 59 is fixed to an upper surface of the boss 51c with a machine screw 66, whereas a distal end 59a of the plate spring 59 is inserted into the casing 51 through a through hole 51d in the casing 51, so that the distal end 59a of the plate spring 59 so inserted is caused to abut with the base portion 52a (a first pressing surface 52b) of the hook 52, whereby the plate spring 59 is held in a state in which the plate spring 59 is bent substantially into a U-shape. Thus, the hook 52 can be held at the stored position (the position shown by the solid line) by virtue of the biasing force of the plate spring 59.

A hooking portion 52d formed at a distal end of the hook 52 by bending a distal end portion of the hook 52 can be stored in the interior of the casing 51 when the hook 52 is disposed at a stored position. As this occurs, the hook 52 can be held stably at the stored position in the interior of the casing 51 by allowing the hooking portion 52d to abut with a stopper 67.

Note that the stopper 67 is attached to the cover plate 58.

When using the hook 52, the finger is hooked on a recess 52e in the hooking portion 52d to swing the hook 52 to the in-use position (the position shown by the imaginary line) against the biasing force of the plate spring 59.

In this state, the hook 52 can be held at the in-use position by allowing the base portion 52a (a second pressing surface 52c) of the hook 52 to be pressed against by the plate spring 59. In this state, something like the clothes of the passenger can be hooked on the hooking portion 52d of the hook 52.

Incidentally, the side portion 31 of the roof lining 30 overlaps the back surface 26a (the back surface of the rear pillar garnish 25) of the frame portion 26 of the rear pillar garnish 25 which is integrally formed with the casing 51 at a location on a passenger compartment side thereof. The airbag 42 is disposed on a back surface 30a of the roof lining 30, and the airbag 42 is then attached to the supporting bracket 43, which is then attached to the upper portion 23 of the side window glass frame member 22 with the machine screws 41 (shown in FIG. 1).

In addition, a cushion material 68 is provided on the frame portion 26 of the rear pillar garnish 25 which is formed integrally with the casing 51 at a location which is situated on a side of the frame portion 26 which faces the outside of the vehicle body, and an edge portion 23a of the side window glass frame member 22 is pressed against the cushion material 68.

Note that an upper end of the rear side window glass 15 is brought into abutment with the cushion material 68.

Figure 6:
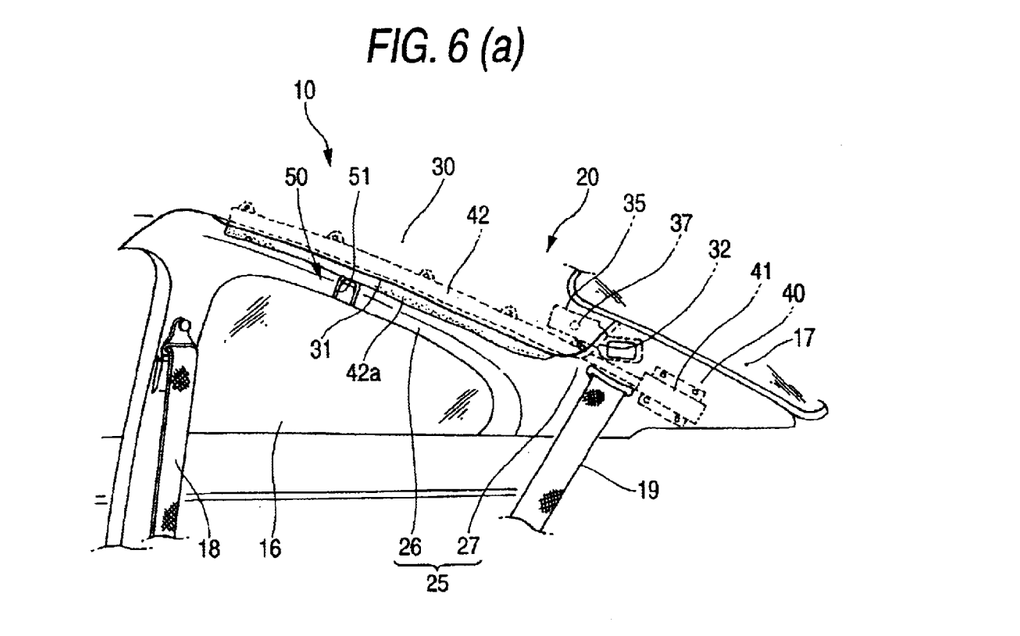
FIG. 6A is a first explanatory view explaining the function of the vehicle body structure with a head protecting airbag according to the invention.
FIG. 6B is another first explanatory view explaining the function of the vehicle body structure with a head protecting airbag according to the invention.

Next, the function of the vehicle body structure with a head protecting airbag will be described with reference to FIGS. 6 and 7.

FIGS. 6A, 6B are first explanatory views explaining the function of the vehicle body structure with a head protecting airbag according to the invention.

In FIG. 6A, when the inflator 41 of the vehicle body structure 20 with a head protecting airbag is activated, a gas is supplied to the airbag 42 from the inflator 41, whereby the airbag 42 starts to be expanded, and the expansion pressure of the airbag 42 is applied to the back surface 30a of the roof lining 30 (refer to FIG. 4).

When the expansion pressure of the airbag 42 is applied to the back surface 30a of the roof lining 30, the side portion 31 of the roof lining 30 deforms and detaches from the frame portion 26 of the rear pillar garnish 25.

When the expansion pressure of the airbag 42 is applied further to the back surface 30a side of the roof lining from this state, a gap is generated between the frame portion 26 of the rear pillar garnish 25 and the side portion 31 of the roof lining 30. Then, a lower portion 42a of the airbag 42 starts to be expanded into the passenger compartment through the gap so generated.

In order to allow the airbag 42 to be expanded into the passenger compartment from the lower portion 42a thereof, the side portion 31 of the roof lining 30 needs to be pushed into the passenger compartment side with the expansion pressure of the airbag 42. As this occurs, the expansion pressure of the airbag 42 is also applied to the frame portion 26 of the rear pillar garnish 25 via the side portion 31 of the roof lining 30.

Further, the casing 51 for the hanger 50 is formed integrally with the frame portion 26 of the rear pillar garnish 25 (refer to FIG. 4), and the casing 51 is attached to the upper portion 23 of the side window glass frame member 22, whereby the frame portion 26 of the rear pillar garnish 25 is rigidly attached to the upper portion 23 of the side window glass frame member 22.

According to the construction, when the airbag 42 is expanded, the pillar garnish 25 can be held securely to the upper portion 23 of the side window glass frame member 22.

On the other hand, in a case where the side portion 31 of the roof lining 30 is pushed out into the passenger compartment side by virtue of the expansion pressure of the airbag 42 which results when the airbag 42 is expanded into the passenger compartment, the expansion pressure of the airbag 42 is also applied to the rear portion 32 of the roof lining 30.

The vicinity of the rear portion 32 of the roof lining 30 is constructed to be attached to the vehicle body panel 21 (shown in FIG. 3) via the supporting bracket 35.

According to the construction, when the airbag 42 is expanded, the rear portion 32 of the roof lining 30 can be held in a state in which the rear portion 32 overlaps the back surface 27b of the rear projecting portion 27 of the rear pillar garnish 25.

In FIG. 6B, when the airbag 42 starts to be expanded, the frame portion 26 of the rear pillar garnish 25 can be securely held to the upper portion 23 of the side window glass frame member 22, and furthermore, the rear portion 32 of the roof lining 30 can be held to the back surface 27b side of the rear projecting portion 27 of the rear pillar garnish 25 (shown in FIG. 6A). Thus, the airbag 42 can be expanded into the passenger compartment through the gap S generated between the frame portion 26 of the rear pillar garnish 25 and the side portion 31 of the roof lining 30.

Figure 7:
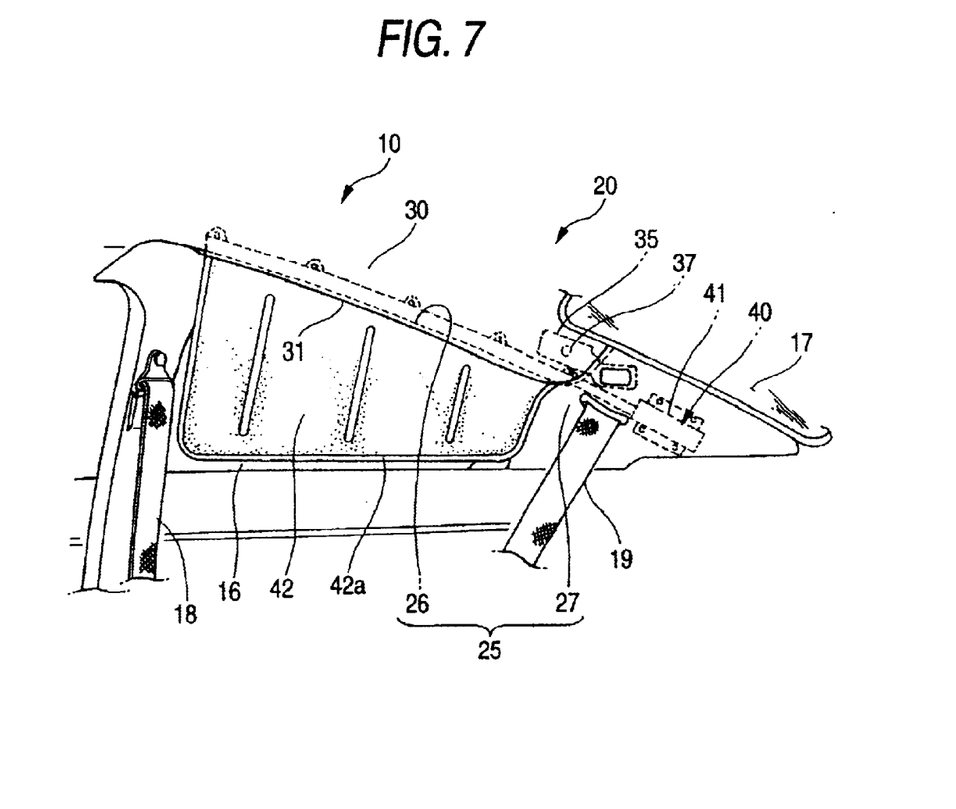
FIG. 7 is a second explanatory view explaining the function of the vehicle body structure with a head protecting airbag according to the invention.

FIG. 7 is a second explanatory view explaining the function of the vehicle body structure with a head protecting airbag according to the invention.

Since the airbag 42 can be expanded into the passenger compartment through the gas S between the frame portion 26 of the rear pillar garnish 25 and the side portion 31 of the roof lining 30, the airbag 42 can be expanded stably, and the performance of the airbag can be exhibited efficiently.

Note that while the embodiment has been described such that the casing 51 for the hanger 50 is formed integrally with the frame portion 26 of the rear pillar garnish 25, the frame member 26 of the rear pillar garnish 25 is rigidly attached to the upper portion 23 of the side window glass frame member 22, and furthermore, the vicinity of the rear portion 32 of the roof lining 30 is attached to the vehicle body panel 21 via the supporting bracket 35, even if only either of these two constructions is implemented, or even if only the vicinity of the rear portion 32 of the roof lining 30 is attached to the vehicle body panel 21 via the supporting bracket 35, effectiveness similar to that provided by the embodiment can also be attained.

In addition, while the embodiment has been described such that the airbag 42 of the head protecting airbag 40 is extended to the center pillar garnish 12, the invention is not limited to the construction, and the airbag 42 can be extended as far as the front pillar garnish 11.

The invention provides the following advantages through the aforesaid constructions.

According to the first aspect of the invention, the supporting bracket is attached to the back surface of the vicinity of the rear portion of the roof lining, and the supporting bracket is attached to the vehicle body panel, whereby the vicinity of the rear portion of the roof lining can be attached to the vehicle body panel via the supporting bracket.

According to the construction, in the event that the expansion pressure of the airbag is applied to the vicinity of the rear portion of the roof lining, the rear portion of the roof lining can be securely left overlapping the back surface of the rear projecting portion of the rear pillar garnish.

Consequently, since the side portion of the roof lining can be dislocated from the frame portion of the rear pillar garnish with good efficiency with the expansion pressure of the airbag so as to ensure the stable expansion of the airbag, the performance of the airbag can be exhibited sufficiently.

According to the second aspect of the invention, the extending portion of the supporting bracket is caused to extend rearward toward the rear projecting portion, and the positioning opening is formed in the extending portion in which the clip boss is allowed to fit. Thus, by forming the positioning opening in the extending portion and inserting the clip boss in the positioning hole so formed, the clip boss can be positioned at the proper position using the positioning hole. Consequently, the clip boss can be simply assembled to the vehicle body panel.

What is claimed is:

1. A vehicle body structure with a head protecting airbag, comprising:

a rear pillar garnish having a frame portion disposed in such a manner as to extend along an upper portion of a rear side window glass frame member, and a rear projecting portion projecting upwardly from a rear end of said frame portion to a rear window glass, said rear projecting portion being attached to a vehicle body panel via a clip boss;

a roof lining having a side portion and a rear portion disposed so as to overlap a back surface of said frame portion and a back surface of said rear projecting portion, respectively;

said head protecting airbag disposed on a back surface of said roof lining; and a supporting bracket attached to a back surface of a vicinity of the rear portion of said roof lining, said supporting bracket being attached to said vehicle body panel.

2. The vehicle body structure according to claim 1, wherein said supporting bracket includes an extending portion extending rearward toward said rear projecting portion, and wherein said extending portion defines a positioning opening into which said clip boss is fitted.

3. The vehicle body structure according to claim 2, wherein said extending portion has a stay abutting with said vehicle body panel at a front end of said extending portion.

4. The vehicle body structure according to claim 1, wherein said clip boss is integrally formed on said rear projecting portion of rear pillar garnish, and a front end of said clip boss is abutted with said vehicle body panel.

5. The vehicle body structure according to claim 1, wherein said roof lining and said rear pillar garnish are disposed so that said side portion of said roof lining is adapted to be dislocated from said frame portion of said rear pillar garnish by virtue of an expansion pressure resulting when said head protecting airbag is expanded, whereby said head protecting airbag is allowed to expand into a passenger compartment through a gap so resulting between said frame portion and said roof lining.

* * * * *